Aug. 25, 1964    A. S. JOUKAINEN ETAL    3,145,420
APPARATUS FOR MELT EXTRUDING FIBER-FORMING
THERMOPLASTIC POLYMERS
Filed May 28, 1963
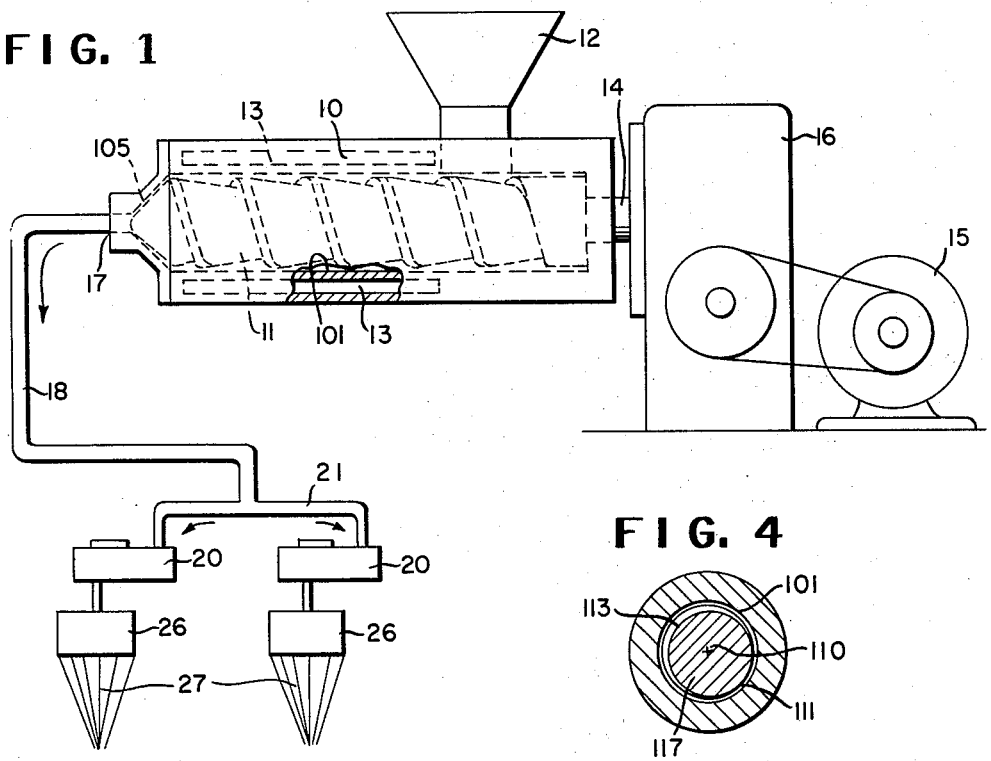
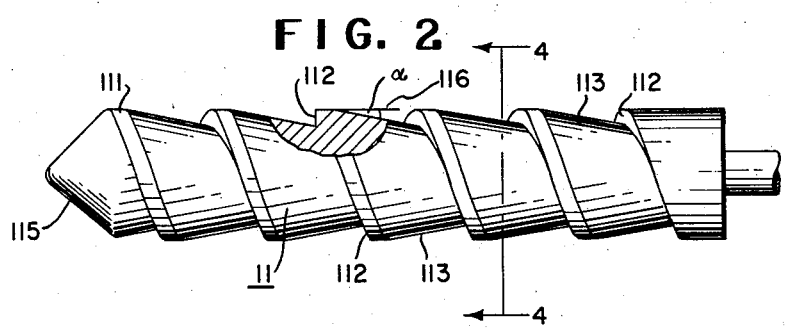
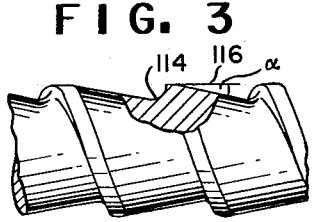
INVENTORS
ARNOLD S. JOUKAINEN
HUGH R. ORTT
BY    *David Katz.*
ATTORNEY

United States Patent Office 3,145,420
Patented Aug. 25, 1964

3,145,420
APPARATUS FOR MELT EXTRUDING FIBER-FORMING THERMOPLASTIC POLYMERS
Arnold S. Joukainen, Wilmington, and Hugh R. Ortt, Seaford, Del., assignors to E. I. du Pont de Nemours and Company, Wilmington, Del., a corporation of Delaware
Filed May 28, 1963, Ser. No. 283,884
3 Claims. (Cl. 18—12)

This invention relates to the production of films and filaments from thermoplastic synthetic polymers such as polyamides and polyesters, and is particularly concerned with the apparatus for simultaneous melting and extruding of such materials under pressure into a metering pump or similar apparatus which forces the molten material through very fine orifices.

It is well known that granular thermoplastic materials such as nylon flakes can be fed to a screw melter-extruder and discharged molten, and under pressure, to a spinning block or other extrusion device. It is equally well known that variations in such factors as screw speed, hold-up time in the screw melter-extruder, and volumetric throughput can have adverse effects on product quality and equipment performance. Poor product quality often manifests itself as degraded polymer, and polymer containing gel and carbonized particles. Gel can be defined as a product of degradation of such gel-susceptible polymers as polyadipamides, which is presumably produced by cross-linking of polymer molecules, and which is generally represented by unfusible, solid agglomerates within the polymer mass, the latter then not being entirely soluble. Such poor extruded-product qualities result in filaments that have variation in dyeability and drawability and have localized points of low tensile strength.

In the production of shaped bodies from thermoplastic resins by extruding them through relatively large orifices, no special problems are involved when it is desired to change the rate of production. When it is desired to change the throughput (rate of production) this can be achieved simply by changing the speed of the screw press which is normally used for effecting simultaneously melting and extrusion. Deleterious effects of change in throughput upon the physical and chemical properties of the resulting shaped body are not expected and are not usually found.

The case is different with fiber-forming polyamides (nylons) or polyesters, because these have to be heated to relatively high temperatures (say 250 to 300° C.) and this factor tends to increase degradation by carbonization and gel formation.

Furthermore, because of the very fine size of the orifices used for forming filaments and films, and moreover because extrusion through such fine orifices is generally preceded by passage through special, highly compact filters, the tolerance for foreign particles such as carbonized materials and gels is very much less than in the case of thermoplastic resins extruded through relatively coarse orifices. Accordingly, the practice of changing throughput by changing the speed of the screw melter-extruder has not been hitherto readily available in the case of fiber forming thermoplastic polymers, except as a sacrifice in the uniformity of the qualities of the product, which is in itself a highly undesirable effect.

Accordingly, it is an object of the present invention to provide a screw melter-extruder of such construction that large variations in throughput may be accomplished by its aid with no significant change in the high quality of the extruded product.

Another important object is to provide a screw in a melter-extruder having such a configuration that variations in the speed thereof over a practically convenient range has essentially no effect on the temperature of the extruded product and but a very slight effect on the pressure thereof.

Other objects and achievements of this invention will appear as the description proceeds.

Now according to this invention, the aforegoing objects are achieved by replacing the hitherto customary feeding screw of ordinary design in the melter-extruder by one which provides a minimum of volume clearance (within the barrel thereof) for the passage of materials and which eliminates any sharp angles, nooks and crannies that could serve as dead pockets or might form local increased hold-up spots for particles of the material being passed through the apparatus.

To achieve this result, this invention resorts to a tapered root extruding screw of the type generally described in Lorenian's U.S. Patent No. 3,065,502, except that whereas Lorenian finds it necessary for his purpose to employ a barrel which has circumferentially spaced longitudinal grooves running through the length of the barrel, we find to the contrary that in our invention the interior of the barrel or casing must be as smooth as possible. For instance, polyadipamides quickly form gels in the grooves of Lorenian's apparatus.

Furthermore, we find it desirable to limit the clearance between screw and barrel so that the volume left over for passage of the material is in the range of 5% to 10% of the inside volume of the empty barrel (for a length equal to the length of the screw). Stated in simpler terms, the clearance area between screw material and inner circumference of the casing at the average cross-section of the apparatus (taken perpendicular to the central axis) is in the range of 5% to 10% of the area of the inner circle of the empty casing at the same cross section.

For a clearer understanding of this invention, reference is now made to the accompanying drawing, in which—

FIG. 1 is a general schematic representation of the apparatus layout needed for starting with nylon chips and ending up with a multifilament yarn.

FIG. 2 is a vertical view, partly in section, of the extruder unit which constitutes the essential part of this invention.

FIG. 3 is a vertical view, partly in section, of a portion of a modified form of the extruder screw used in this invention.

FIG. 4 is a cross sectional view taken along line 4—4 of FIG. 2, including the surrounding barrel in schematic form.

Referring to FIG. 1, barrel (or casing) 10 receives cold nylon chips from hopper 12, which are then pushed forward (toward the left) by screw 11 which is driven by shaft 14 receiving its power from motor 15 through gear reduction box 16. The material being transported is thermoplasticized to a viscous molten state partly by the heat developed in the screw 12 and partly by heat from electric coils or steam supplied through jacket 13. At the outlet 17, the molten material passes through an orifice, whch is restricted sufficiently to build up a back pressure in the moving mass of molten material, of the order of 500 to 1000 p.s.i.g. The material then flows through heat insulated conduit 18 to metering pumps (gear pumps) 20 which are driven by independent power means (not shown). From the gear pumps, the molten mass is forced through spinning heads 26, and the emerging bundles of filaments 27 are cooled, drawn and twisted into yarn in conventional manner.

The extruding screw preferred for this invention is shown in detail in FIG. 2 and is intended for use in a cylindrical casing 10 (FIG. 1) which is to be made with a smooth inner bore 101 of uniform diameter up to the convergent tip 105 near the outlet. Screw 11 is made up of flights which merge with the shaft or "root" of the screw on their trailing side but possess a sharply defined face with essentially radial line elements on the other side. Accordingly, each flight comprises a land 111 which is part of a cylindrical surface coaxial with the axis of the casing. From the leading edge of this land the surface drops down abruptly and radially toward the axis of the screw and provides the pushing surface 112 for the material being transported. From the trailing edge of each flight rearward, the surface slants gradually rearward and inwards (toward the axis) along line 113 until it meets the leading surface 112 of the next rearward flight. Thus, there is essentially no distinct shaft portion or root to the screw, the rear of each flight and the root portion behind it merging into a single quasi-conical mass of metal.

In the design shown in FIG. 2, the radial elements of the leading face of each flight are straight lines and therefore intersect conical surface 113 in an essentially sharply outlined helical line. But in FIG. 3, a modification of this invention is shown, wherein the said leading face curves to the left as it drops toward the axis, so that eventually it merges with conical surface 113 through a concave, meniscus curve 114.

The tip 115 of the screw in this invention involves another departure from the Lorenian screw. Instead of having an S-shaped cross section containing concave facets, the tip in our invention is of an essentially conical form, with essentially circular (hence, convex) cross sections throughout. Except at the extreme tip which may be rounded off, the cone 115 is designed to fit with minimal clearance the conical converging tip 105 of the casing, near the outlet.

The slant of the quasi-conical surface 113, plays an important role in the proper functioning of the screw; accordingly, the angle $\alpha$ between the straight-line elements of this surface and an imaginary line 116 drawn parallel to the axis of the screw should be not less than 3° and not greater than 8°. When the screw root taper is much less than about 3°, the extruded product lacks uniformity. When the screw root taper is much more than about 8°, gel is formed in the depth, the outlet temperature is unacceptably high, and the screw melter-extruder is exceedingly difficult to operate.

The diameter of the cylindrical land portion is likewise critical, and should be large enough to allow no dead spaces wherein material could linger, between the land and the inner cylindrical surface of the casing. As a guide for good practice, it has been found that the best results are obtained when the total volume clearance between casing and screw (including the spaces between the lands and the barrel as well as those between the slanting portions 113 and the barrel, but excluding the tip portion) is of a value in the range of 5% to 10% of the volume of the empty casing bore. If the volume for passage of material is less than 5% of said total volume, the resultant screw melter-extruder is uneconomical to operate. If the volume is greater than 10%, the novel device has no advantage over the conventional screw melter-extruder, and low volumetric throughput is accompanied by gel formation as well as by erratic and unacceptable performance.

In FIG. 4, the aforementioned volume limitation is expressed in terms of areas of the cross section, which of course is of the same pattern and the same magnitude throughout any lengthwise portion of the screw and casing which is uniform as to the angle $\alpha$ above defined. The area of the eccentric, nearly circular section 117 of the screw 11 is of a value from 90 to 95% of that of the area of circle 101, which is the boundary of the bore of the casing. As a practical illustration, in an apparatus where the casing has a bore 12″ in diameter, the lands of the screw must clear the bore by a radial distance of about 0.05 inch.

In an actual test with this invention with a casing having a bore 6.75 ft. long and 12″ in diameter, a screw of the following characteristics was employed:

Length (exclusive of the conical tip) _____feet__ 6.75
Outside diameter of screw _____inches__ 11.9
Screw root taper (near the inlet) _____degrees__ 6

The inside volume of the empty bore (for the length of 6.75 ft.) calculates to about 5.3 ft.$^3$. The clearance volume in the same length when the tapered root screw is inserted calculates to about 0.49 ft.$^3$, which is about 9.25% of the empty volume.

The above apparatus was used in actual service continuously for 113 days, with the variations and results set forth in Table I below. For comparison, a parallel installation using a conventional screw of the same length and outside diameter was also used and observed for the same period, the variations and results being also set forth in Table I. By "conventional" screw here we mean that the flights were distinct from the root and were characterized by a flat land bounded on each side by two symmetrically disposed radial surfaces dropping off sharply toward the axis of the screw. See for instance, Processing of Thermoplastic Materials, edited by Bernhardt; Reinhold Publ. Co., 1959; pages 156, 157 and 171; FIGS. 4.2, 4.4 and 4.13 (second from top). The clearance volume in the above conventional screw calculates to about 0.9 cu. ft., which is about 17% of the empty volume.

*Table I*

|  | Novel Screw | | | Conventional Screw | |
|---|---|---|---|---|---|
| Throughput, lbs./hr_____ | 275 | 370 | 740 | 600 | 1,300 |
| Screw speed, r.p.m_____ | 7 | 11 | 24 | 10 | 25 |
| Temp. of polymer melt at outlet, ° C___ | 280 | 280 | 280 | 290 | 288 |
| Pressure of polymer melt at outlet, p.s.i.g_____ | 900 | 900 | 900 | 500 | 900 |
| Observed variations in polymer melt pressure, p.s.i.g_____ | ±10 | ±10 | ±10 | ±20 | ±50 |
| Holdup time, min_____ | 6.7 | 5.0 | 2.5 | 5.6 | 2.6 |
| Mechanical power input, percent of total power input_____ | 35 | 51 | 50 | 17 | 36 |

As seen from the table, the novel screw melter-extruder operated well when the throughput was within the range 275 to 740 pounds per hour. It operated excellently when the throughput was within the range 350 to 700 pounds per hour. The novel melter-extruder did not develop gel during the 113 days of continuous operation at low rates. The extruded product had excellent drawability, high tensile strength and good dyeability. In the conventional screw melter-extruder, however, at a throughput of 600 lbs./hr., gel formation was observable, and when the throughput was allowed to drop to about 450 lbs./hr., the performance was no longer of acceptable quality.

Very unexpectedly, a high percentage of mechanical work input and exceptional screw stability was observed with the screw melter-extruder of this invention. Operation at high percentages of mechanical work input is not possible with conventional screw melter-extruders at low relative volumes (i.e. low ratio of clearance volume to empty barrel volume). Attempts to operate conventional screw melter-extruders at low relative volumes result in surging and unstable operation as well as in gel formation that require plant shutdown.

The novel screw melter-extruder of this invention operates satisfactorily to produce high-quality product at as low a capacity as ⅓ of its maximum capacity. With the conventional screw, however, the permissible range in throughput variation is much more restricted, and trouble (as indicated by the quality of the product) is experienced even at a relative drop in throughput of about ½ (i.e. from 1300 to 600).

The screw melter-extruder of this invention may be applied to the processing of synthetic polymers such as polyamides, polyesters, polyolefins, and copolymers and blends thereof. It is particularly useful for polyamides which are prepared from the condensation polymerization of adipic acid and a diamine, since these polyamides have a strong tendency to form gel.

The helical screw of this invention may be advantageously operated with customary adjuncts such as mixing heads (Bernhardt, page 158, type 5), kneading devices, and devolatilizing sections (ibid., page 163). This invention may also be used by arranging two or more of the novel screw and casing combinations in parallel, as well as in series, with or without aforesaid customary adjuncts.

The changes in throughput indicated in the above table are put into effect by varying (through gear-reduction box 16) the r.p.m. of the extruder screw. Of course, this step should be followed up by a corresponding change in the speed of the gear pumps 20, to avoid undue back pressure or a break in the continuity of the molten material flowing to the spinnerets.

In lieu of the two metering pumps and spinning heads shown in FIG. 1, a bank of a larger plurality of such units may be employed, all being fed in parallel by a correspondingly modified distributing head 21, receiving material from pipe 18.

Although we have concentrated our discussion on a screw in which the quasi-conical sections 113 were of uniform slant throughout the length of the barrel, our invention may be modified if desired to vary said slant (within the limits of 3° to 8°) from one region along the screw to another, whereby for instance to provide a larger clearance between screw and barrel in the region near the hopper 12 and but minimum clearance near the discharge end.

Other variations and modifications will be readily apparent to those skilled in the art. Accordingly, it is to be understood that this invention is not to be limited to the specific embodiments thereof except as defined in the appended claims.

We claim as our invention:

1. An apparatus for melt-extruding fiber-forming, thermoplastic synthetic polymers, comprising in combination a stationary cylindrical casing having a smooth circular bore of constant diameter extending lengthwise for essentially the full length of said casing, an inlet for feeding comminuted solid thermoplastic material near one end of said casing, an outlet for molten material near the other end of said casing, and a helical extruding screw within said circular bore extending essentially for the full length thereof, said helical screw being of a tapered root structure wherein the trailing side of the flights and the root of the screw between flights merge to form a single quasi-conical, helically winding surface which tapers rearwards from the trailing edge of the land of any given flight to a minimum radius in the vicinity of the leading face of the next rearward flight, said taper having an angle not less than 3° and not greater than 8° with respect to a line parallel to the axis of the helix, the radius of the land of the helical flight being constant throughout the helix and differing from the radius of said smooth circular bore by an amount selected to provide a total clearance volume between helix and casing, for the entire length of the apparatus exclusive of the conical tip portion, equal to not less than 5% and not more than 10% of the volume of the empty casing in the same length.

2. An apparatus as in claim 1, wherein the leading face of each flight is made up of straight-line, radial elements which intersect in a relatively sharp point with the tapering surface extending rearwards from the next forward flight.

3. An apparatus as in claim 1, wherein the leading face of each flight is made up of curved elements of predominantly radial direction, but which merge gradually into the tapering surface extending rearwards from the next forward flight.

References Cited in the file of this patent

UNITED STATES PATENTS 3,065,502     Lorenian _____ Nov. 27, 1962